United States Patent Office 2,791,957
Patented May 14, 1957

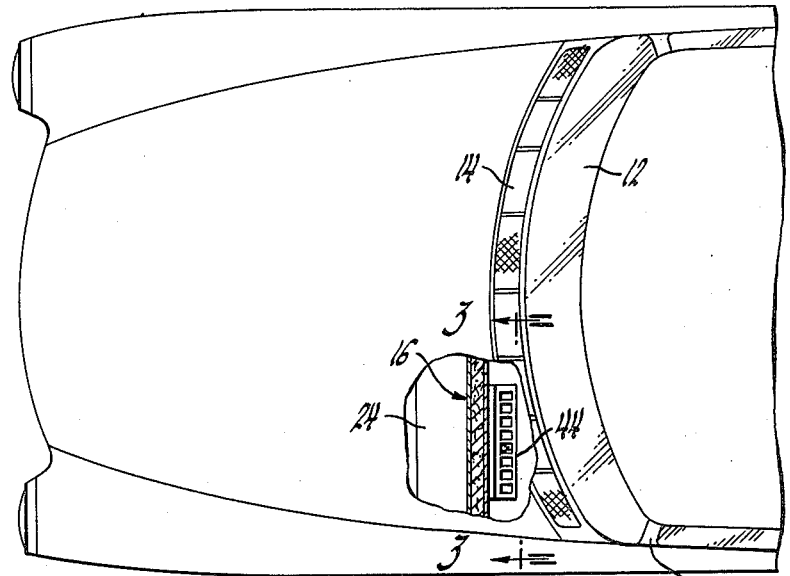
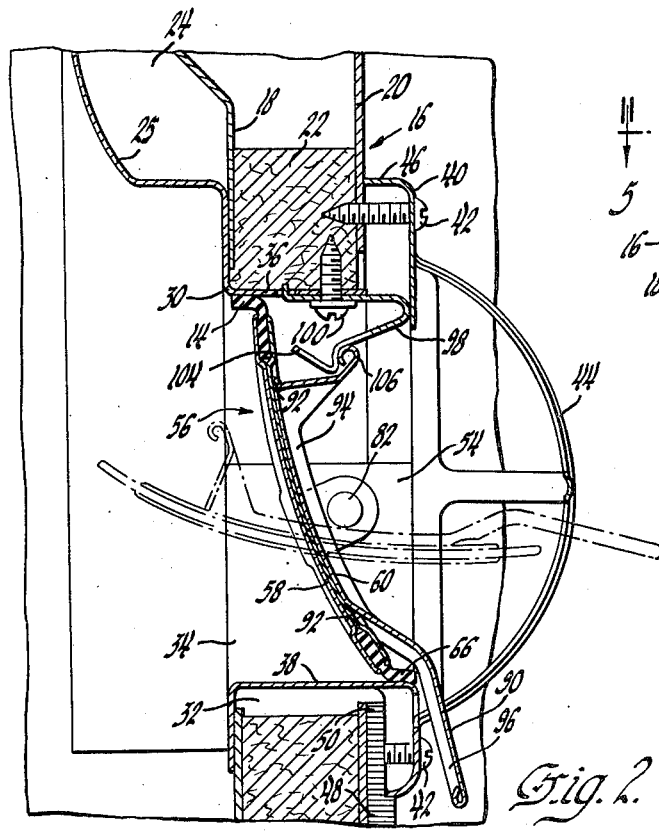

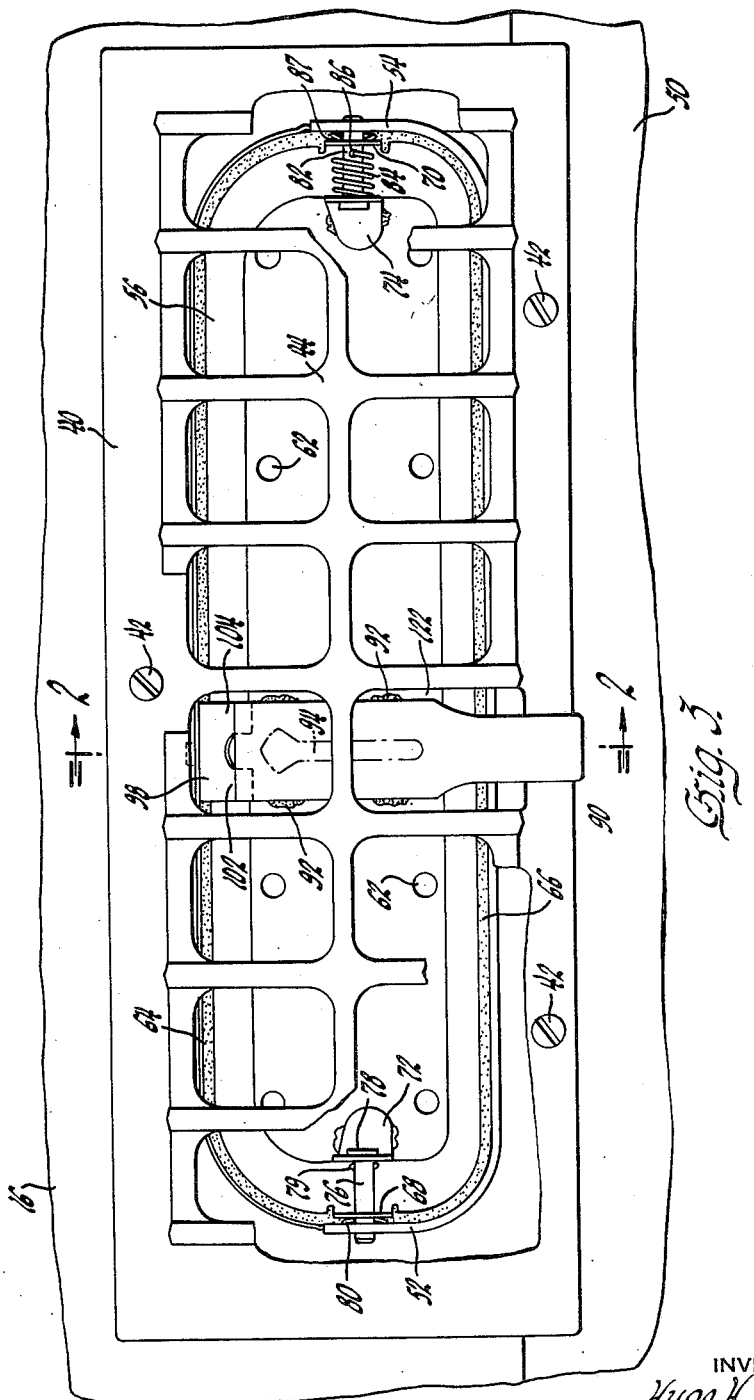

2,791,957
VENTILATOR VALVE ASSEMBLY

Hugo H. Wendela, Detroit, Mich., assignor to General Motors Corporation, Detroit, Mich., a corporation of Delaware Application November 8, 1954, Serial No. 467,348

1 Claim. (Cl. 98—2)

This invention relates to a ventilator valve assembly and more particularly to a ventilator valve assembly for use with a vehicle body to control the flow of air which may be passed through the fire wall thereof for improving the comfort of vehicle passengers.

A ventilator valve for use on vehicles must be compact in structure, trouble and rattle-free in use, convenient to operate, efficient in its function as a tight closure, and of such a nature as to lend itself to quantity production.

One object of the present invention is to provide a ventilator valve assembly which satisfies the above requirements and is of attractive appearance.

A feature of the invention is a pivotally mounted valve associated with a grille having an arcuate portion partially concealing the valve and through which means extend for operation of the valve.

The above and other features of the invention will now be more particularly described by reference to the accompanying drawings and pointed out in the claim.

In the drawings:

Fig. 1 is a plan view, partially in section of the forward portion of an automobile in which the present invention is embodied;

Fig. 2 is a sectional view taken along the line 2—2 of Fig. 3;

Fig. 3 is an enlarged view in elevation taken in the direction of the arrows 3—3 in Fig. 1;

Fig. 4 is a sectional view showing a modified construction of a detail shown in Fig. 2; and Fig. 5 is a sectional view taken along the line 5—5 of Fig. 4.

In a number of types of automotive vehicle bodies it has been found expedient and advantageous to admit ventilating air into the passenger compartment through the fire wall. A vehicle body of this type is disclosed in the application for United States Letters Patent S. N. 392,806, filed November 18, 1953, in the names of James D. Leslie, Robert M. Fox and Lloyd E. Muller and entitled, "Vehicle Body With Built-In Ventilation System."

In the drawings a body 10 of the above type is disclosed and this body includes a windshield 12, an elongated cowl air inlet 14 and a conventional fire wall 16 separating the engine compartment from the passenger compartment. This fire wall consists of sheet metal pieces 18 and 20 between which is confined sound-absorbing and insulating material 22.

A blister structure 24 is located forwardly of the fire wall and, as in the patent application above referred to serves to conduct air entering at 14 so that it will pass forwardly and downwardly and then rearwardly through the fire wall 16 and into the passenger compartment. This structure includes a trough 25 for entrapping moisture entrained in the air and conducting it to a suitable drain.

A ventilator valve assembly of the present invention comprises a frame 30 which is constructed of sheet metal and which is of rectangular configuration and adapted to be inserted in an opening 32 cut through the fire wall. This frame member may conveniently be made integral with the trough 25 as shown in the drawing but this expedient is not essential in utilizing the present invention. The frame 30 defines an opening or fluid flow passage 34 for directing the air horizontally and comprises an upper horizontal wall 36 and a lower horizontal wall 38.

A grille 40 is attached to the fire wall 16 by means of screws 42 and is arranged in such position that an arcuate portion 44 thereof is in registry with the opening 34. The grille has a forwardly directed flange or margin 46 directed toward the fire wall and a portion thereof as at 48 (Fig. 2) is cut away to accommodate the upper margin of carpet material 50 covering the toe board and the lower part of the rearwardly directed side of the fire wall.

The bottom wall 38, which is part of the frame 30, extends upwardly at 52 and 54 (Fig. 3) forming supports on which a two-piece butterfly type valve 56 may be pivotally mounted. The valve is arcuate in shape as seen in Fig. 2 and comprises two pieces of sheet metal 58 and 60 which are welded together as at points 62. The margins of the two pieces 58 and 60 are so formed as tightly to receive and retain flexible and resilient strips 64 and 66 of rubber-like material.

The metal sheet 60 is provided with rearwardly extending ears 68 and 70 and cooperatively associated with these ears are two brackets 72 and 74, each of which is L-shaped in cross section and welded to the plate 60. As seen in Fig. 3, a pin 76 having a head 78 passes through the flange 72 and the ear 68 as well as the frame portion 52. The pin is fixed in relation to the valve 56 by staking as at 79. A spring washer 80 is interposed between the portion 52 and the ear 68. A similar pin 82 passes through the flange 74, the ear 70 and into the frame portion 54; but in this case, a coil spring 84 is arranged about the pin 82 and one end of the spring is anchored at 86 to the pin and the other end of the spring is in engagement with the bracket 74. A spring washer 87 is employed between the portions 54 and 70. With this arrangement, mounting of the door may quickly be accomplished by inserting the pin 82 into the frame comprising the spring 84 and then inserting the pin 76.

Attached to a mid-portion of the valve 56 is a lever 90 which is welded to the valve as at points 92. Advantageously, this lever bears ribs 94 and 96 which serve as means for strengthening the lever against bending stresses which may be imposed thereon.

In one embodiment, as shown in Figs. 2 and 3, a spring latch member 98 is attached to the wall 36 by means of a screw 100. This latch is bifurcated to present two spring fingers 102 and 104 which are positioned to engage a rolled-over portion 106 forming an extension of one end of the lever 90.

In the modified construction of Figs. 4 and 5 the latch means 98 of Fig. 2 is dispensed with and a spring latch 110 may be substituted. This latch is held in position by means of an upturned lip 112 inserted through a small slot 114 in the wall 38 and a screw 116 passing through the latch and into the wall. The latch 110 comprises two cooperative spring arms 118 and 120 which are positioned to engage the exposed end portion of the valve lever 90 when the valve 56 is placed in its closed position.

It will be noted that one end of the lever 90 extends through an opening 122 (Fig. 3) in the grille portion 44 and that when the lever 90 is depressed, the flexible strips 64 and 66 come into tight engagement with the frame 30 forming a tight closure. The washer springs 80 and 87 serve to retain the valve in any preselected position and either of the latches shown may be utilized to retain the valve in its closed position. It is to be noted that the pivot pins 76 and 80 are located below the center of the valve 56. This aids in preventing opening of the valve when air pressure in the blister structure 24 rises due to the ram effect as the vehicle is under way.

It will be appreciated that for operation of the valve, the handle or lever 90 as well as the latch mounted at or on the valve may be dispensed with without departing from the present invention. In such an event the valve may conveniently be operated by other means such as a Bowden wire fixed to the valve and leading through the grille 40 to the instrument panel or other area conveniently accessible to the operator. Frictional resistance against movement of the Bowden wire may be relied upon to hold the valve in its selected position and, if necessary, a detent arrangement may be provided to hold the Bowden wire against longitudinal movement and in accordance with selected positions of the valve.

I claim:

A ventilator valve assembly adapted for use on the fire wall of a vehicle body to control fluid flow through an opening in said fire wall, said assembly including a rectangular frame insertable in said opening to form a flow passage, a grille adapted to be attached to the rear side of said fire wall in registry with said flow passage and having an arcuate vertical cross section, a curved butterfly valve pivotally mounted on said frame for movement about a horizontal axis to control flow through said passage, said valve having resilient marginal sealing strips, a manually operable lever rigidly fixed to said valve for rotation therewith, one end of said lever extending rearwardly, through and beyond said grille, latch means arranged to hold said valve in fully closed position, and spring means for yieldably holding said valve in open position.

References Cited in the file of this patent
UNITED STATES PATENTS

| | | |
|---|---|---|
| 363,181 | Tallmage | May 17, 1887 |
| 822,408 | Tuttle | June 5, 1906 |
| 1,248,926 | Schantz | Dec. 4, 1917 |
| 2,324,858 | Levine | July 20, 1943 |
| 2,612,829 | Joyce | Oct. 7, 1952 |
| 2,631,517 | Duhn | Mar. 17, 1953 |
| 2,678,587 | Simons | May 18, 1954 |